(12) United States Patent
Kozak et al.

(10) Patent No.: US 8,725,413 B2
(45) Date of Patent: May 13, 2014

(54) LOCATION AND MOTION ESTIMATION USING GROUND IMAGING SENSOR

(75) Inventors: Kristopher C. Kozak, San Antonio, TX (US); Marc C. Alban, San Antonio, TX (US); Samuel E. Slocum, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 12 days.

(21) Appl. No.: 13/537,776

(22) Filed: Jun. 29, 2012

(65) Prior Publication Data

US 2014/0005932 A1 Jan. 2, 2014

(51) Int. Cl.
*G01C 21/12* (2006.01)
*G01C 21/30* (2006.01)
G01S 13/86 (2006.01)
G01S 19/48 (2010.01)
G01S 19/49 (2010.01)

(52) U.S. Cl.
CPC ............. *G01C 21/30* (2013.01); *G01S 13/86* (2013.01); *G01S 19/48* (2013.01); *G01S 19/49* (2013.01)
USPC ........... 701/446; 701/300; 701/400; 701/454; 701/455; 701/468; 701/491; 701/500; 701/501; 701/516; 701/523; 342/537.34

(58) Field of Classification Search
CPC ......... G01C 21/30; G01S 13/86; G01S 19/48; G01S 19/49
USPC ......... 701/300, 400, 454, 455, 468, 491, 500, 701/501, 516, 523; 382/100, 106, 154, 190, 382/201, 284, 285, 294, 305; 340/990, 340/995.19, 995.27; 342/357.34, 457, 458; 358/448, 452; 356/3, 601; 348/143
See application file for complete search history.

(56) References Cited

U.S. PATENT DOCUMENTS

| | | | |
|---|---|---|---|
| 7,333,631 B2 | 2/2008 | Roh et al. | |
| 7,525,484 B2 * | 4/2009 | Dupray et al. | 342/450 |
| 7,764,231 B1 * | 7/2010 | Karr et al. | 342/457 |
| 7,856,203 B2 | 12/2010 | Lipovski | |
| 7,904,483 B2 | 3/2011 | Koch et al. | |
| 7,917,543 B2 | 3/2011 | Koch et al. | |
| 7,920,721 B2 | 4/2011 | Unoura | |
| 8,351,704 B2 * | 1/2013 | Kmiecik et al. | 382/190 |
| 8,442,305 B2 * | 5/2013 | Ramalingam | 382/154 |
| 2005/0063563 A1 | 3/2005 | Soliman | |
| 2006/0095172 A1 | 5/2006 | Abramovitch et al. | |
| 2008/0045236 A1 * | 2/2008 | Nahon et al. | 455/456.1 |
| 2010/0161225 A1 | 6/2010 | Hyung et al. | |
| 2010/0208937 A1 * | 8/2010 | Kmiecik et al. | 382/100 |
| 2010/0215216 A1 | 8/2010 | Hong et al. | |

(Continued)

*Primary Examiner* — McDieunel Marc
(74) *Attorney, Agent, or Firm* — Grossman, Tucker et al.

(57) ABSTRACT

A system and method for estimating location and motion of an object. An image of a ground surface is obtained and a first set of features is extracted from the image. A map database is searched for a second set of features that match the first set of features and a geo-location is retrieved from the map database, wherein the geo-location is associated with the second set of features. The location is estimated based on the retrieved geo-location. The motion of the object, such as distance travelled, path travelled and/or speed may be estimated in a similar manner by comparing the location of extracted features that are present in two or more images over a selected time period.

8 Claims, 9 Drawing Sheets

(56) References Cited

U.S. PATENT DOCUMENTS

| | | |
|---|---|---|
| 2010/0215218 A1 | 8/2010 | Takahashi |
| 2010/0304850 A1* | 12/2010 | Gelman et al. ............ 463/25 |
| 2011/0077032 A1 | 3/2011 | Correale et al. |
| 2011/0111724 A1 | 5/2011 | Baptiste |
| 2011/0150319 A1* | 6/2011 | Ramalingam ............ 382/153 |
| 2011/0164832 A1 | 7/2011 | Yoon et al. |
| 2013/0109345 A1* | 5/2013 | Edge et al. ............ 455/404.2 |
| 2013/0210405 A1 | 8/2013 | Whipple et al. |

* cited by examiner

LOCATION AND MOTION ESTIMATION USING GROUND IMAGING SENSOR

FIELD OF INVENTION

The present disclosure relates to location and motion estimation, and in particular to vehicle location and motion estimation using a ground imaging sensor.

BACKGROUND

Existing location systems, such as those used in moving vehicles, typically employ Global Positioning System (GPS) receivers. These systems generally suffer from a number of limitations such as limited precision and accuracy, a requirement of unobstructed line of sight to multiple satellites in the GPS constellation, and susceptibility to jamming and denial of service. Although some of these limitations may be overcome through the use of additional technology and equipment, these approaches are typically expensive.

Inertial navigation systems may provide an alternative method for self location of a vehicle from a known starting point. These systems use accelerometers but they require calibration and tend to drift over time thus requiring periodic re-calibration which limits their accuracy and suitability for many applications.

What is needed, therefore, are improved methods and systems for autonomous self location and motion determination of an object, such as a moving vehicle, with increased reliability and precision.

SUMMARY

The present disclosure describes methods and systems for estimating location and motion of an object using a ground imaging sensor. In some embodiments, the ground imaging sensor may be an electro-optic sensor such as, for example, a camera. Images of the ground surface beneath the vehicle may thus be obtained and analyzed to extract identifying features. These features may include, for example, patterns of fissures in the pavement, arrangements or patterns of stone or gravel in the road surface, or any other features that may be identified. The location may be estimated by comparing the extracted features to a map database that includes features extracted from previously obtained ground images taken within the same geographic area. The map database may further include geo-locations associated with each previously obtained image and feature set. The location estimation may thus be based on the geo-locations stored in the map database.

Motion, such as distance travelled, path travelled and/or speed, may also be estimated by obtaining successive images of the ground surface, extracting features from each image and identifying the appearance of common features in two or more images. Such imaging and feature extraction may be completed for a selected time period. A difference between the location of a feature in the first image versus the location of that feature in the second image provides the basis for an estimate of motion.

BRIEF DESCRIPTION OF DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION OF PREFERRED EMBODIMENTS

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

The present disclosure relates to location and motion estimation of an object associated with the method or device, such as a person or vehicle utilizing the device to identify a given location or the motion that is occurring over a given time period. The present disclosure is therefore particularly suitable for identifying vehicle location and/or motion estimation using a ground imaging sensor. The vehicle may include, but not be limited to, an automobile, truck, train or any other ground based vehicle.

In some embodiments, the ground imaging sensor may be an electro-optic sensor such as, for example, a camera. Images of the ground surface beneath the vehicle may thus be obtained and analyzed to extract identifying features. These features may include, but not be limited to, patterns of fissures in the pavement, arrangement or patterns of stone or gravel in the road surface, or any other features that may be identified. The vehicle location may be estimated by comparing the extracted features to a map database that includes features extracted from previously obtained ground images taken within the same general geographic area within which the vehicle may be expected to operate, that is to say, a geographic area of interest. The map database may further include geo-locations associated with each previously obtained image and feature set. The vehicle location estimation may thus be based on the geo-locations stored in the map database.

Motion may also be estimated for a particular time period. For example, vehicle motion may represent a distance travelled by the vehicle, the track or path that the vehicle traverses and/or the speed of the vehicle. The motion may be estimated by obtaining successive images of the ground surface, extracting features from each image and identifying the appearance of common features in two or more images. A difference between the location of a feature in the first image versus the location of that feature in the second image provides the basis for an estimate of the motion of the vehicle. Speed of the vehicle may be determined when timing information is available for the successively obtained images.

Figure 1:
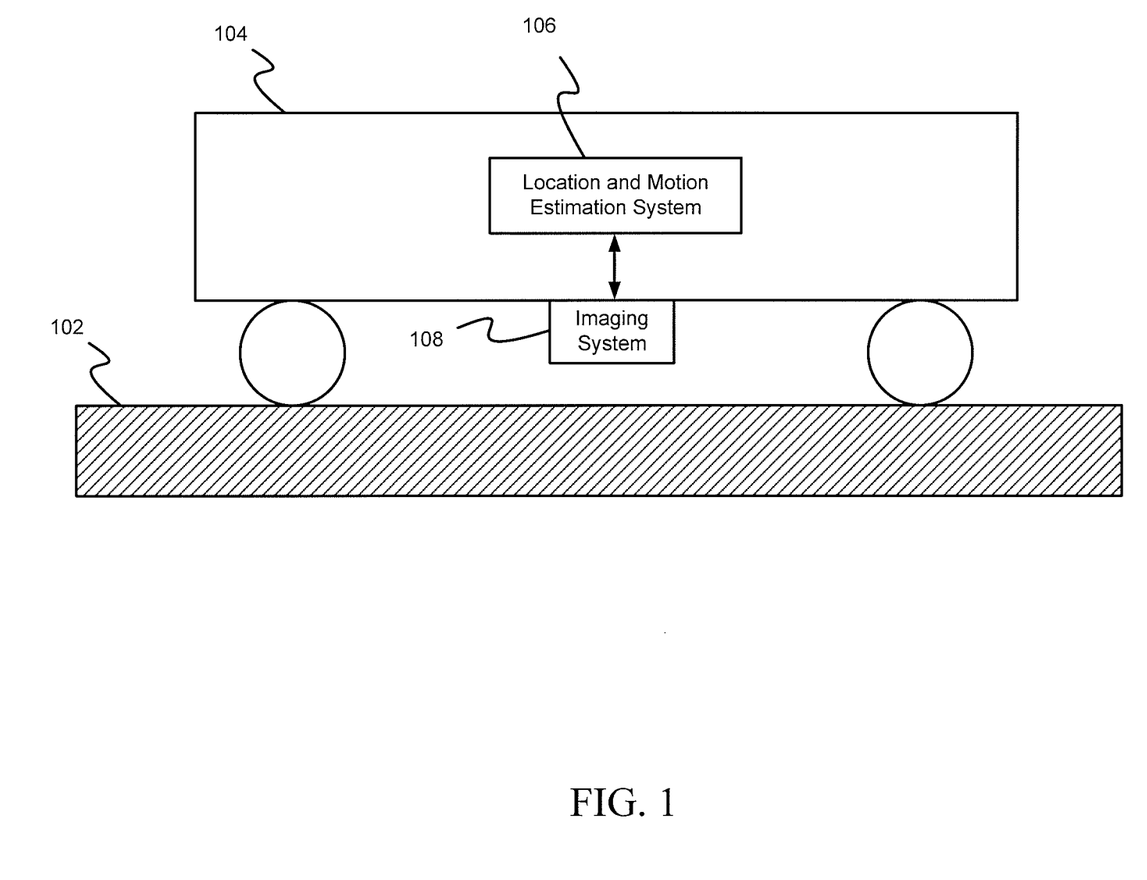
FIG. 1 illustrates a top-level system diagram of one exemplary embodiment consistent with the present disclosure.

Referring now to FIG. 1, there is shown a top-level diagram 100 of a system deployment of one exemplary embodiment consistent with the present disclosure as applied to a vehicle, but it can be appreciated that the device and method herein may be used to identify location of any object associated with this exemplary embodiment. The vehicle 104 may be located above a ground surface 102. The vehicle 104 may be in motion or may be stationary. An imaging system 108 may be located beneath vehicle 104 in any position or orientation suitable for obtaining images of the ground surface 102. The images so obtained may then be transmitted to the location and motion estimation system 106, the operation of which will be described in greater detail below.

The vehicle 104 may be any type of ground based vehicle and the ground surface may be any type of surface including, but not limited to, roads (for vehicular traffic), parking lots, fields, trails (primarily for pedestrians and certain off-road vehicles). The surfaces may be paved, for example with asphalt or concrete, or they may be unpaved including gravel, stone, sand or dirt surfaces.

In some embodiments, the location and motion estimation system 106 may be located within the vehicle 104, as shown, while in other embodiments it may be located remotely and may communicate with the vehicle through wireless communication mechanisms. In some embodiments, one portion of the location and motion estimation system 106 may be located within the vehicle 104 while the remainder may be located remotely. It will be appreciated that, for example, one or more instances of the map database may be located remotely and shared between systems in different vehicles.

Figure 2:
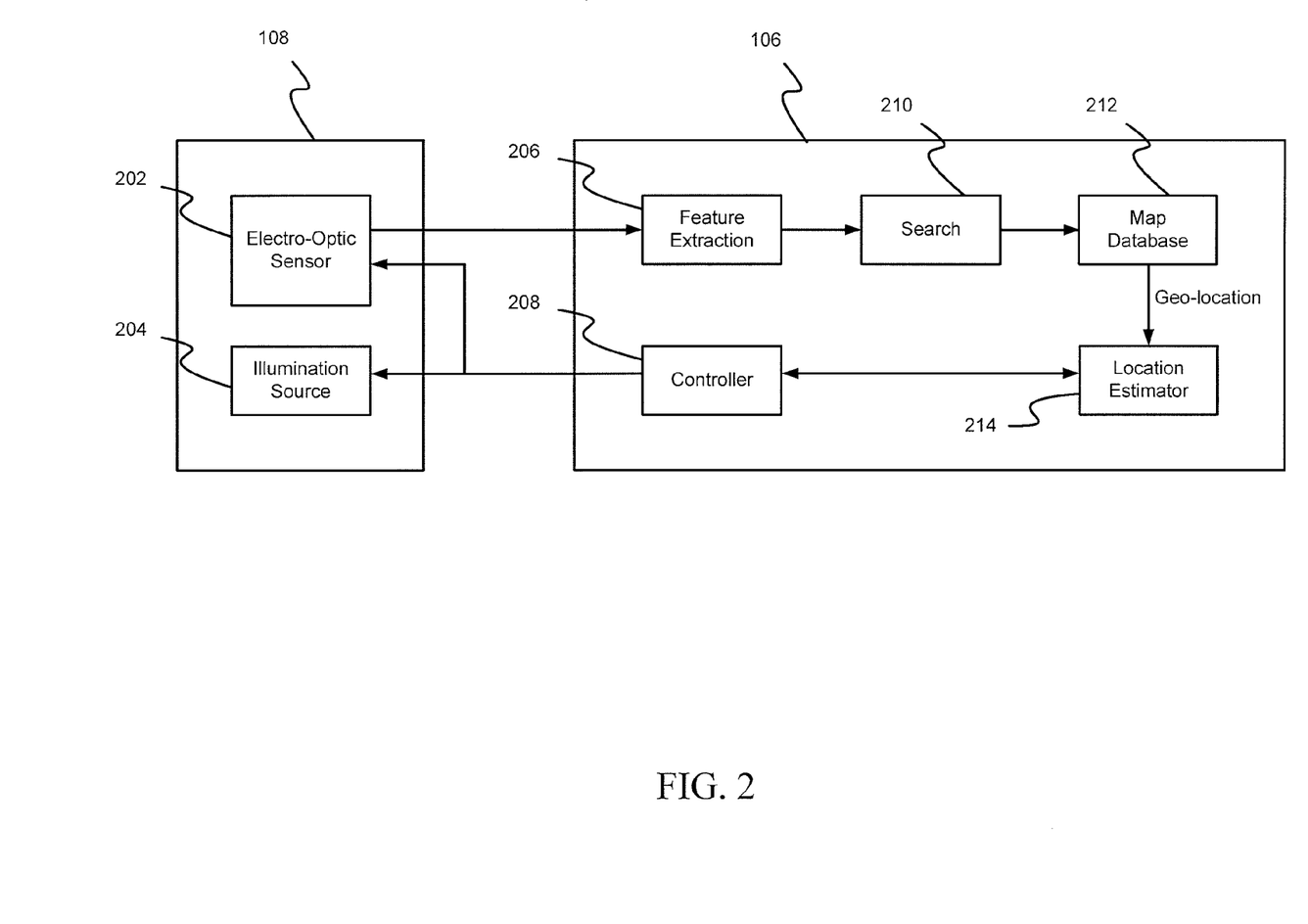
FIG. 2 illustrates a system block diagram of one exemplary embodiment consistent with the present disclosure.

Referring now to FIG. 2, there is shown a more detailed view of imaging system 108 and location and motion estimation system 106 consistent with an exemplary embodiment the present disclosure. In this embodiment, the location estimation aspects of system 106 are illustrated and discussed.

Imaging system 108 is shown to comprise an electro-optic sensor 202 and an illumination source 204. One or more Electro-optic sensors 202, such as a camera, may be deployed. The sensors may typically be mounted below the vehicle 104 in an orientation directed towards the ground surface. In some embodiments the sensors may employ line scanning or area scanning techniques. The sensors may be aligned longitudinally and/or laterally with the vehicle. Two sensors may be employed in a stereoscopic configuration to generate 3-dimensional images. The sensors may be configured to operate in one or more suitable spectral ranges including, for example, broadband visible, near infrared, ultraviolet, etc.

Illumination source 204 may provide a stable source of illumination, at an intensity and in a spectral range, which is compatible with the sensor 202 such that consistent imaging results may be obtained, independent of other sources of ambient light. In some embodiments, the illumination may be strobed with a relatively low duty cycle (e.g. 1-2%) to reduce external visibility of the vehicle and reduce average power consumption while providing increased peak power output. In some embodiments, the peak power output of the strobe illumination may be on the order of 1000 W. The strobe timing may be synchronized with the sensor image acquisition.

Location and motion estimation system 106 is shown to comprise a feature extraction module 206, a search module 210, a map database 212, a location estimator module 214, and a controller module 208. Feature extraction module 206 obtains the image acquired by sensor 202 and analyzes the image to extract any identifying features that may be present in the ground surface. The features, which may be grouped in a feature set to be associated with the image, may include, for example, patterns of cracks and fissures in the pavement, arrangements of stone or gravel in the road surface, or any other features that may assist in providing a unique identification of the ground surface image. Search module 210 searches map database 212 for a stored feature set that matches the currently extracted feature set. In some embodiments, a match may be considered to have been achieved when measured differences between the two features sets being compared fall below a threshold that may be either pre-determined or adjustable.

The matching process may be performed sequentially on several levels and in several different ways to minimize the occurrence of false matches and incorrect location estimates. These steps therefore may include: application of appearance based features matching (which may on its own generate many false/bad matches); application of geometric constraints (using both camera view constraints and constraints related to the flatness of the ground) to rule-out a large portion of mis-matched features; use of confidence metrics in combination with stochastic filters (e.g. Kalman filters) that discount uncertain measurements and provide a memory of previous location estimates (which makes it relatively easier to rule out single frame matches that significantly disagree with current overall estimates of current positions). Each of these steps may therefore have their own parameters and thresholds that combine to give useful location estimates.

In some embodiments, an approximate location of the vehicle 104 may be known or available, either through other means or from previous estimation attempts. In such case, the approximate location may be advantageously used to limit the database search to a constrained geographic region, with a resultant decrease in search time. This may be possible where the map database is organized such that feature data can be retrieved efficiently for a specific region. The construction and maintenance of the map database will be described in greater detail below.

Map database 212 also stores geo-locations that are associated with the stored feature sets. If search module 210 succeeds in matching a currently extracted feature set to a previously stored feature, the associated geo-location may be retrieved from the database and used to estimate the vehicle location.

In some embodiments controller module 208 may be provided to control and coordinate the activities of the other system modules and components. For example, controller 208 may synchronize illumination source 204 with sensor 202 and determine the timing of image acquisition based on location estimation requirements.

In some embodiments, the system may be calibrated to account for the distance between the imaging system and the ground surface and/or to compensate for curvature in the ground surface (e.g., crowning on a road bed). The calibration may be performed prior to system deployment or in real-time during system deployment.

Figure 3:
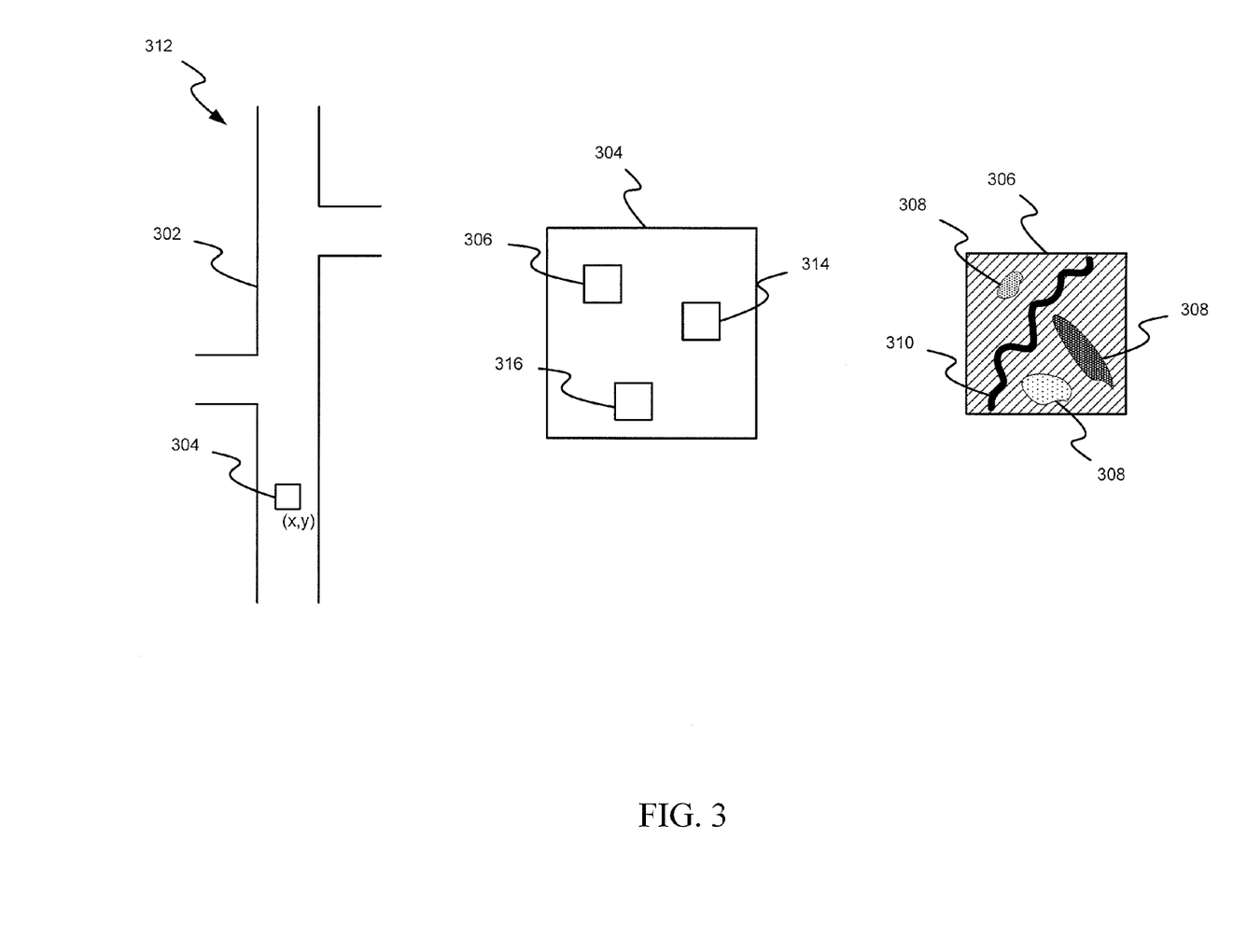
FIG. 3 illustrates the use of features and geo-locations in a mapping database in accordance with an exemplary embodiment of the present disclosure.

Referring now to FIG. 3, the use of features and geo-locations in a mapping database, in accordance with an exemplary embodiment of the present disclosure, is illustrated. An example road 302 is shown as part of a map 312 in the map database.

In general the map may comprise a large number of roads covering a geographic area of interest. Any number of areas along road 302 may be imaged, as shown for example in area 304. A geo-location, for example (x,y) coordinates, may be determined for the area 304 using any suitable location determination method, for example GPS. The coordinates (x,y) may be referenced to any suitable coordinate system, for example latitude and longitude.

The image of area 304 may be analyzed to identify and extract any number of features 306, 314, 316. It will be appreciated that the ability to uniquely identify an image area will improve with the number of features extracted. An example feature 306 is shown to comprise a ground surface crack 310 and a pattern of gravel fragments 308. The geo-location and associated features for each area image 304 are stored in the map database. In some embodiments, the image may also be stored in the map database along with any other relevant information, for example the time and date of image acquisition which may be useful for scheduling updates to portions of the map database.

Figure 4:
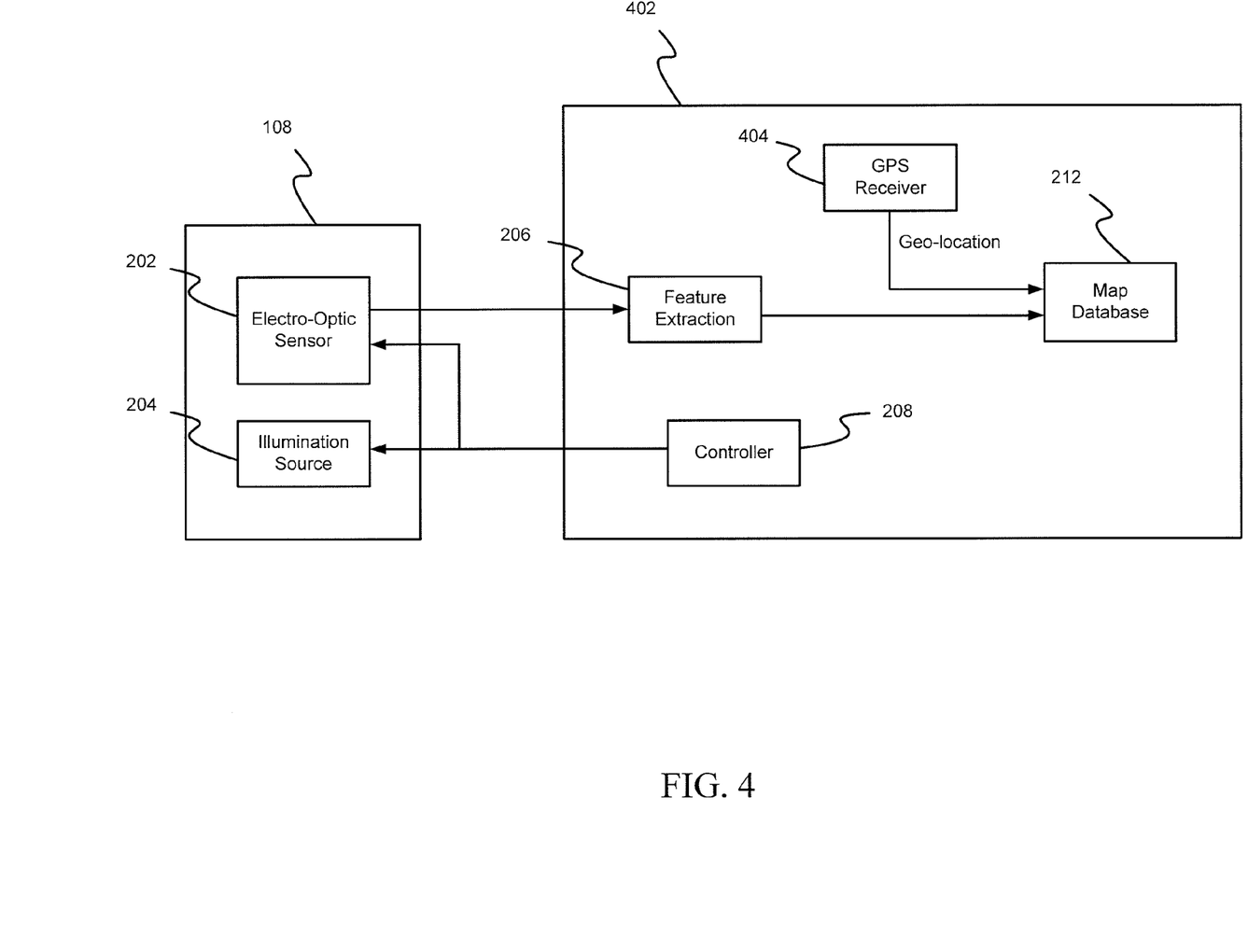
FIG. 4 illustrates a system block diagram of another exemplary embodiment consistent with the present disclosure.

Referring now to FIG. 4, there is shown a more detailed view of imaging system 108 and map database construction system 402 consistent with an exemplary embodiment the present disclosure. Imaging system 108 is shown to comprise an electro-optic sensor 202 and an illumination source 204. These elements may be configured to operate in the manner described above in connection with the description of FIG. 2. The imaging system 108 may be located beneath a vehicle that is employed for collecting information used to construct the map database. Map database construction system 402 is shown to comprise a feature extraction module 206, a GPS receiver 404, a map database 212 and a controller module 208.

Feature extraction module 206 obtains the image acquired by sensor 202 and analyzes the image to extract any identifying features that may be present in the ground surface as described previously in connection with FIG. 2. GPS receiver 404 acquires a geo-location to be associated with the image although any suitable location method or mechanism may be used for this purpose. The extracted features and geo-location are stored in the map database 212 for later use by the vehicle location and motion estimation system 106. The map database may be organized to facilitate retrieval of features and geo-location information in an efficient manner, particularly when an approximate location or region is known when querying the database. For example, the map database may be indexed by geographic regions at varying levels of detail.

In some embodiments controller module 208 may be provided to control and coordinate the activities of the other system modules and components. For example, controller 208 may synchronize illumination source 204 with sensor 202 and determine the timing of image acquisition based on map database construction requirements.

Figure 5:
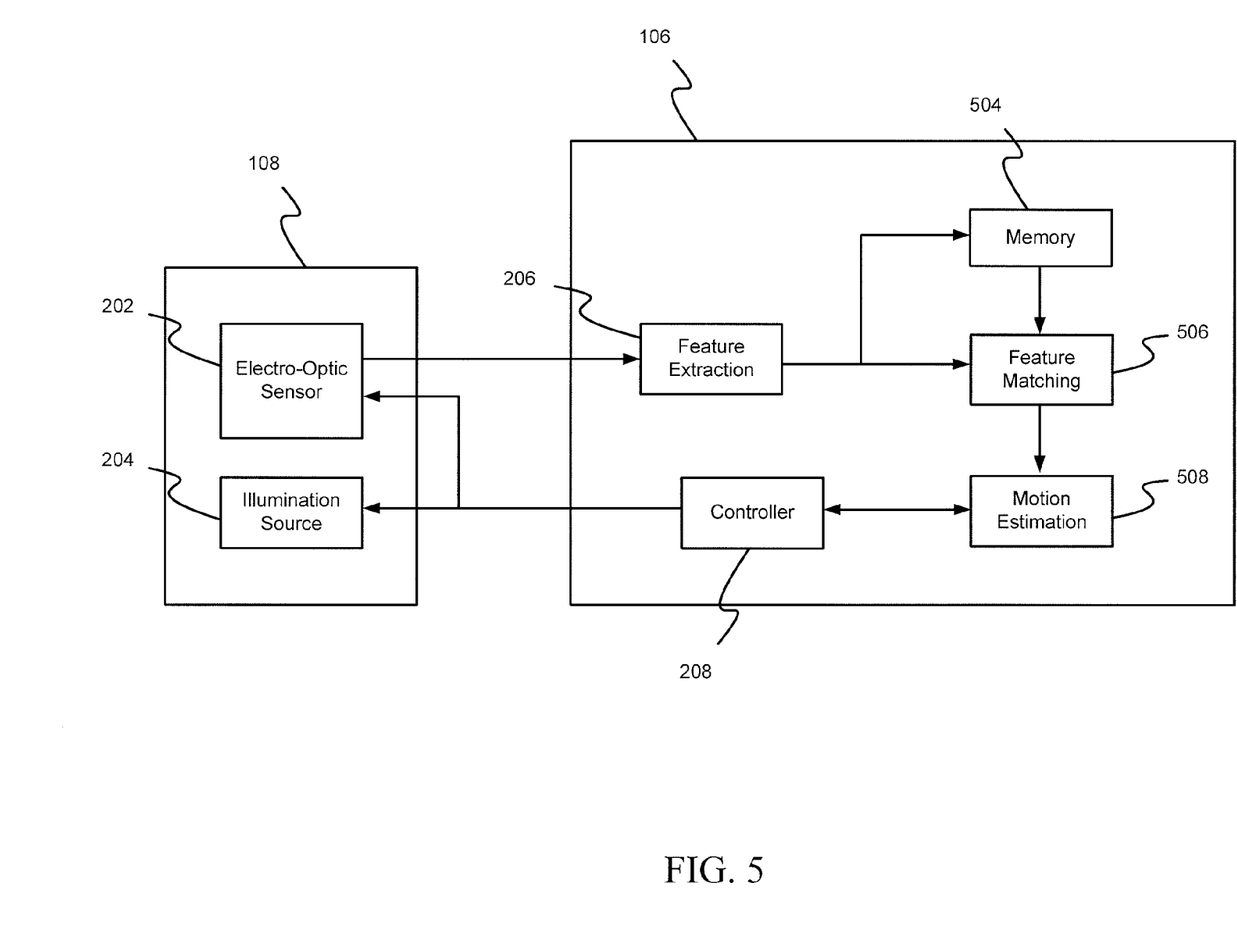
FIG. 5 illustrates a system block diagram of another exemplary embodiment consistent with the present disclosure.

Referring now to FIG. 5, there is shown a more detailed view of imaging system 108 and location and motion estimation system 106 consistent with an exemplary embodiment the present disclosure. In this embodiment, the motion estimation aspects of system 106 are illustrated and discussed. Imaging system 108 is shown to comprise an electro-optic sensor 202 and an illumination source 204. These elements may be configured to operate in the manner described above in connection with the description of FIG. 2. Location and motion estimation system 106 is shown to comprise a feature extraction module 206, a memory 504, a feature matching module 506, a motion estimation module 508, and a controller module 208.

Feature extraction module 206 obtains the image acquired by sensor 202 and analyzes the image to extract any identifying features that may be present in the ground surface as described previously in connection with FIG. 2. The extracted features are provided to feature matching module 506 and are also stored in memory 504 for future use. Feature matching module 506 attempts to match features from the currently acquired image with stored features from previously acquired images in memory 504. If common features are determined to be present in two or more images then motion estimation module 508 may determine the motion of the vehicle based on the change in location of the features between subsequent images.

It should be noted that reference to "common" features above means that the same feature, which may correspond to some exposed aggregate, a crack, a stain, etc. (note that these are features in the image processing sense, which means that they really just represent pixel patterns of light and dark and may or may not actually correspond to human-interpreted features like a piece of gravel or a crack), is visible in both frames. The apparent movement of the features in the image frame can then be used to estimate the differential motion—displacement and rotation. Again, the matching here may combine appearance-based feature matching as well as application of geometric constraints. Other, and more computationally efficient approaches that do not necessarily use image features, such as row or column-wise cross-correlation approaches, may be used to estimate relative motion when subsequent frames are known to overlap.

Additionally, if image acquisition timing information is available then vehicle velocity can be estimated. This differential motion, as measured between subsequent images, may also be used to smooth and/or supplement the location estimations obtained by the methods previously described, as for example in connection with FIG. 2.

In some embodiments controller module 208 may be provided to control and coordinate the activities of the other system modules and components. For example, controller 208 may synchronize illumination source 204 with sensor 202 and determine the timing of image acquisition based on motion estimation requirements.

Figure 6:
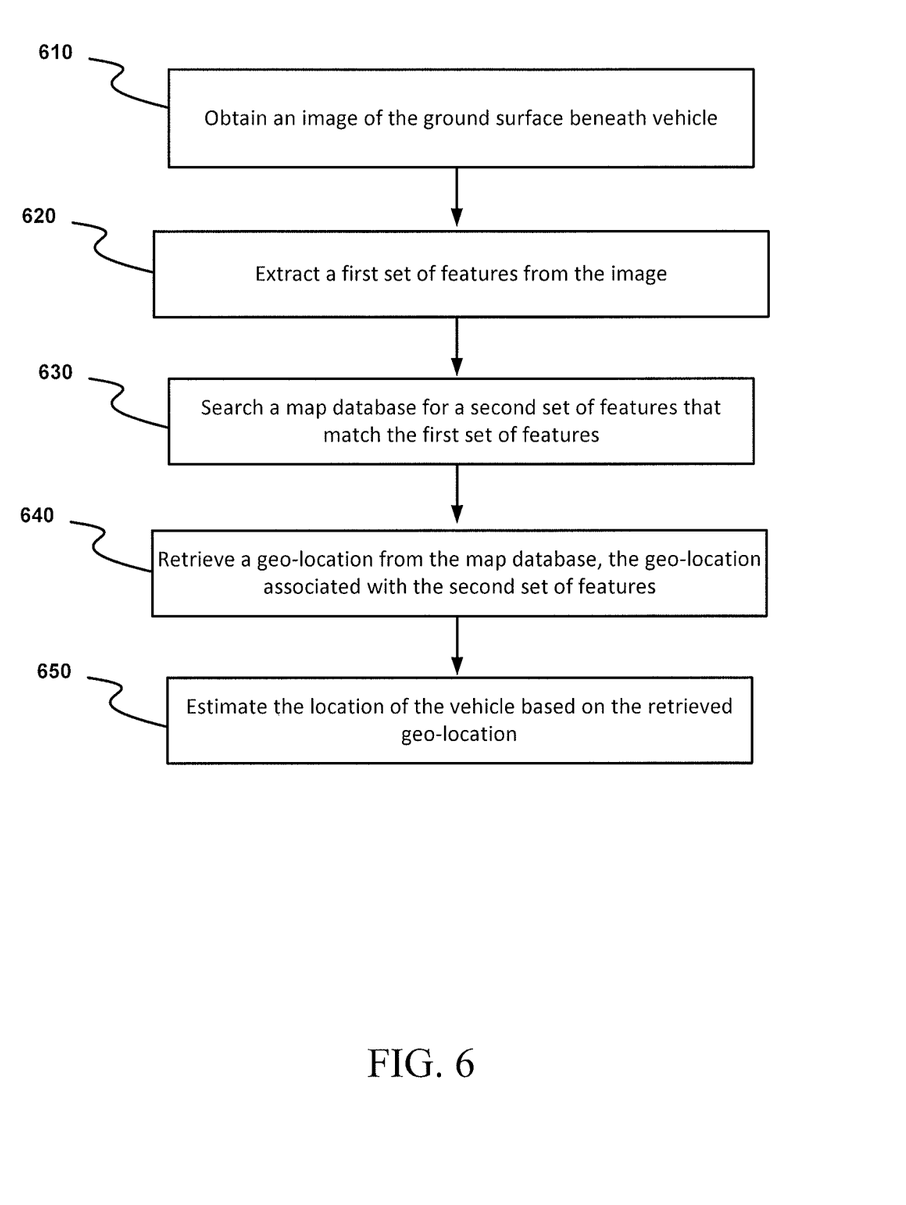
FIG. 6 illustrates a flowchart of operations of one exemplary embodiment consistent with the present disclosure.

Referring now to FIG. 6, there is supplied a flowchart 600 of one of the preferred methods consistent with an exemplary embodiment of a location estimator according to the present disclosure. At operation 610, an image of the ground surface beneath the vehicle is obtained. The image may be acquired by a camera mounted below the vehicle. At operation 620, a first set of features is extracted from the image. Features may include any identifiable characteristics or properties of the ground surface. At operation 630, a map database is searched for a second set of features that match the first set of features. The map database stores features extracted from previously collected images of ground surfaces at known locations throughout a geographic area of interest. At operation 640, a geo-location is retrieved from the map database. The geo-location is associated with the second set of features. At operation 650, the location of the vehicle is estimated based on the retrieved geo-location.

Figure 7:
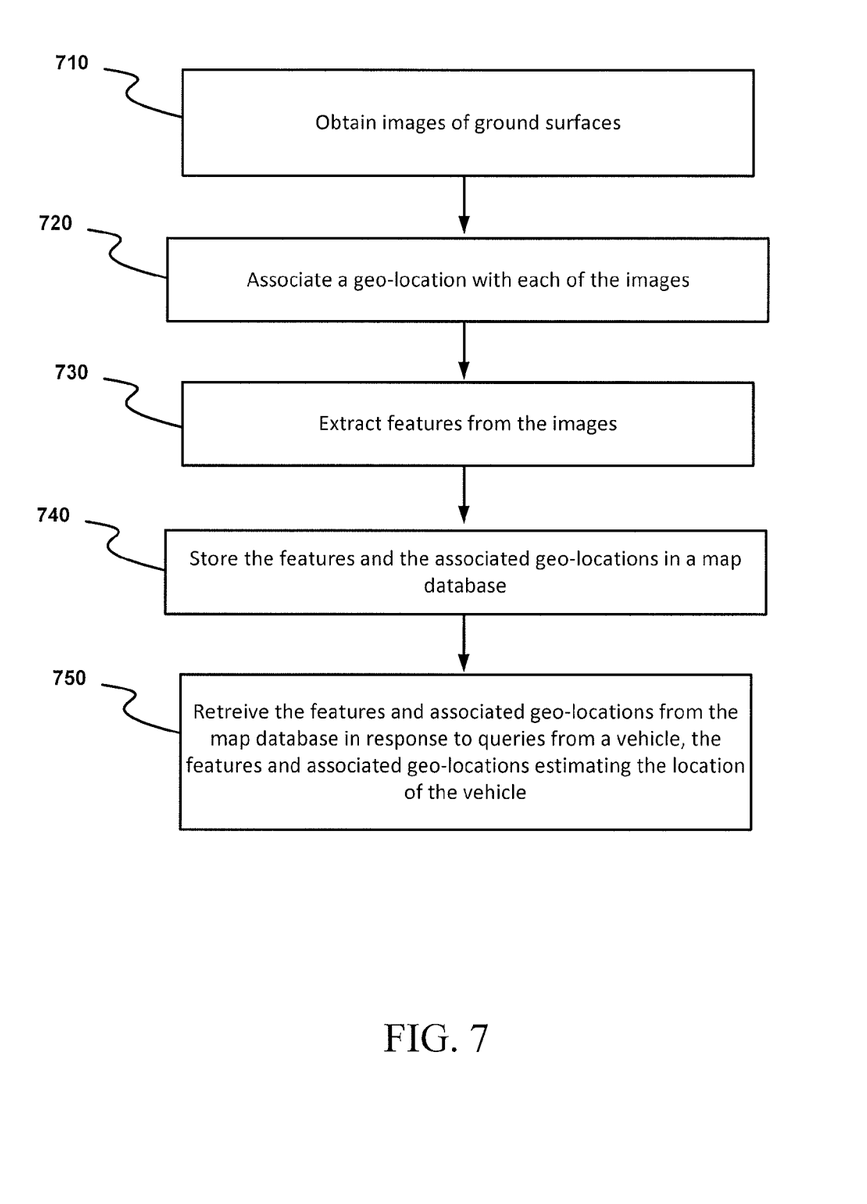
FIG. 7 illustrates a flowchart of operations of another exemplary embodiment consistent with the present disclosure.

Referring now to FIG. 7, there is supplied a flowchart 700 of one of the preferred methods consistent with an exemplary embodiment of a location estimator according to the present disclosure. At operation 710, ground surface images are obtained. The images may be collected from a number of locations throughout a geographic area of interest. At operation 720, a geo-location is associated with each of the images. The geo-locations may be acquired from a GPS receiver or through any other suitable means. At operation 730, features are extracted from the images. Features may include any identifiable characteristics or properties of the ground surface. At operation 740, the features and the associated geo-locations are stored in a map database. At operation 750, the features and associated geo-locations are retrieved from the map database in response to queries from a vehicle. The features and associated geo-locations estimate the location of the vehicle.

Figure 8:
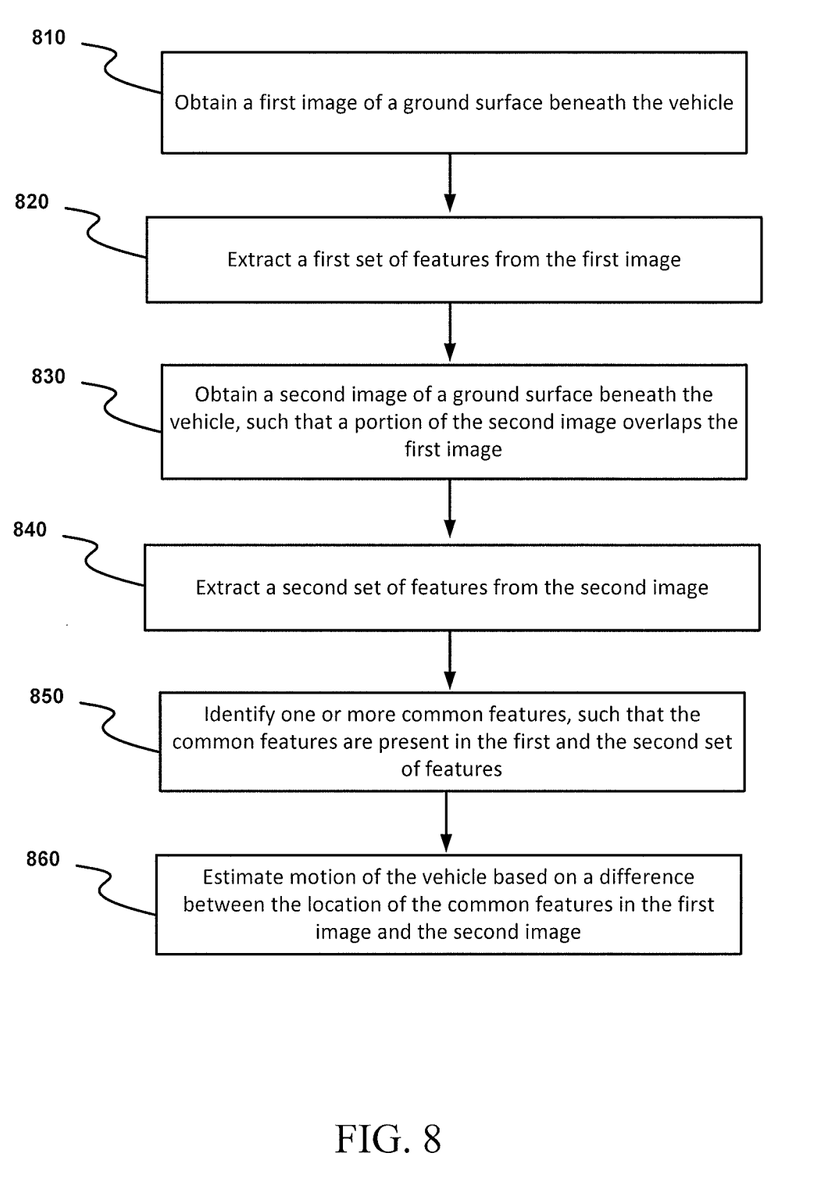
FIG. 8 illustrates a flowchart of operations of another exemplary embodiment consistent with the present disclosure.

Referring now to FIG. 8, there is supplied a flowchart 800 of one of the preferred methods consistent with an exemplary embodiment of a location estimator according to the present disclosure. At operation 810, a first image of the ground surface beneath the vehicle is obtained. The image may be acquired by a camera mounted below the vehicle. At operation 820, a first set of features is extracted from the first image. Features may include any identifiable characteristics or properties of the ground surface. At operation 830, a second image of a ground surface beneath the vehicle is obtained, such that a portion of the second image preferably overlaps the first image. At operation 840, a second set of features is extracted from the second image. At operation 850, one or more common features are identified, such that the common features are present in the first and the second set of features. At operation 860, motion of the vehicle is estimated based on a difference between the location of the common features in the first image and the second image. Motion may represent a distance travelled by the vehicle, the track or path that the vehicle traverses and/or the speed of the vehicle.

In view of the foregoing, it may be appreciated that the present disclosure also relates to an article comprising a non-transitory storage medium having stored thereon instructions that when executed by a machine result in the performance of the steps of the methods as described in the examples above such as, for example, in connection with the descriptions associated with FIGS. 6-8.

Figure 9:
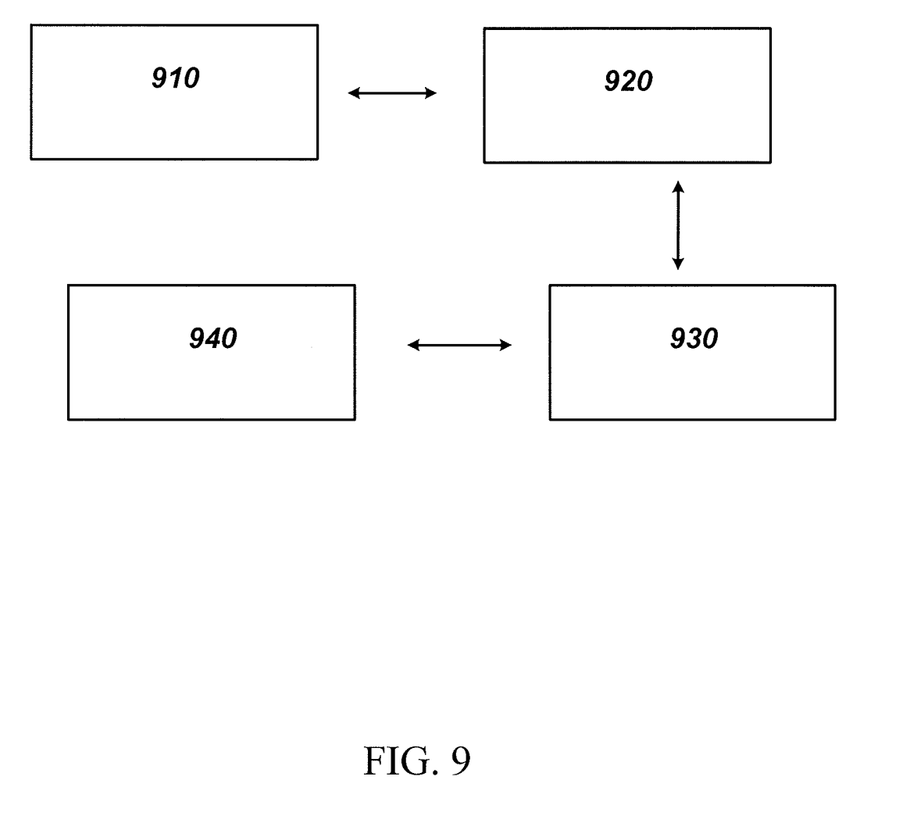
FIG. 9 illustrates a processor, machine readable media, imaging input and user interface that may be employed in an exemplary embodiment consistent with the present disclosure.

It should also be appreciated that the functionality described herein for the embodiments of the present invention may therefore be implemented by using hardware, software, or a combination of hardware and software, as desired. If implemented by software, a processor and a machine readable medium are required. The processor may be any type of processor capable of providing the speed and functionality required by the embodiments of the invention. Machine-readable memory includes any non-transitory media capable of storing instructions adapted to be executed by a processor. Non-transitory media include all computer-readable media with the exception of a transitory, propagating signal. Some examples of such memory include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g., floppy disk and hard drive), optical disk (e.g. CD-ROM), and any other device that can store digital information. The instructions may be stored on a medium in either a compressed and/or encrypted format. Accordingly, in the broad context of the present invention, and with attention to FIG. 9, the system and method for the herein disclosed vehicle location and motion estimation may be accomplished with a processor (910) and machine readable media (920) and user interface (930) plus imaging input (940).

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A method for estimating a location comprising:
obtaining an image of a ground surface;
extracting, by a processor, a first set of features from said image;
searching a map database for a second set of features that match said first set of features, wherein said searching is restricted to a subset of said map database, said subset comprising geo-locations within a geographic area of interest;
retrieving a geo-location from said map database, wherein said geo-location is associated with said second set of features; and
estimating, by a processor, said location based on said retrieved geo-location.

2. The method of claim 1, wherein said image is obtained from an electro-optic sensor.

3. The method of claim 1, wherein said ground surfaces include at least one of a road, a parking lot, a field or a trail.

4. A system for estimating a location comprising:
an imaging sensor configured to obtain an image of a ground surface;
a processing module configured to extract a first set of features from said image; and
a map database configured to store a plurality of sets of features and associated geo-locations, wherein said processing module is further configured to search said map database for a second set of features that match said first set of features and retrieve a geo-location associated with said second set of features such that said location is estimated based on said retrieved geo-location, wherein said searching is restricted to a subset of said map database, said subset comprising geo-locations within a geographic area of interest.

5. The system of claim 4, wherein said imaging sensor is an electro-optic sensor.

6. The system of claim 4, further comprising an illumination source configured to strobe in synchronization with said sensor imaging.

7. The system of claim 4, further comprising a GPS receiver, wherein said geographic area of interest is based on an approximate location provided by said GPS receiver.

8. The system of claim 4, wherein said ground surfaces include at least one of a road, a parking lot, a field or a trail.

* * * * *